May 15, 1928.
F. W. MEYER
1,669,527
METHOD OF AND APPARATUS FOR PRODUCING MODIFIED CURRENTS, ETC
Original Filed Feb. 1, 1918
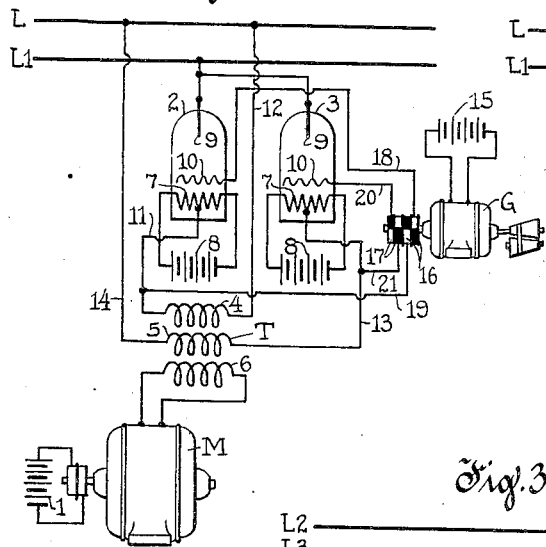
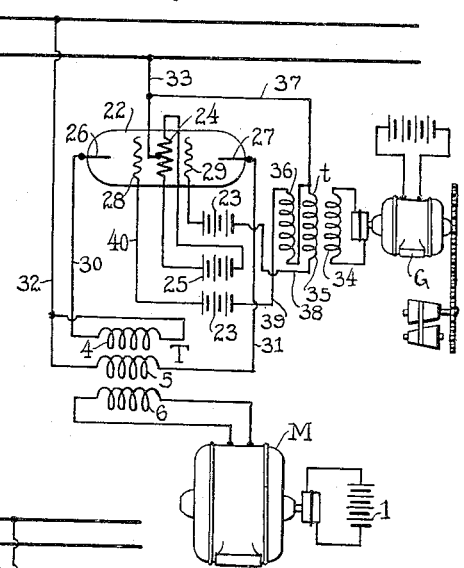
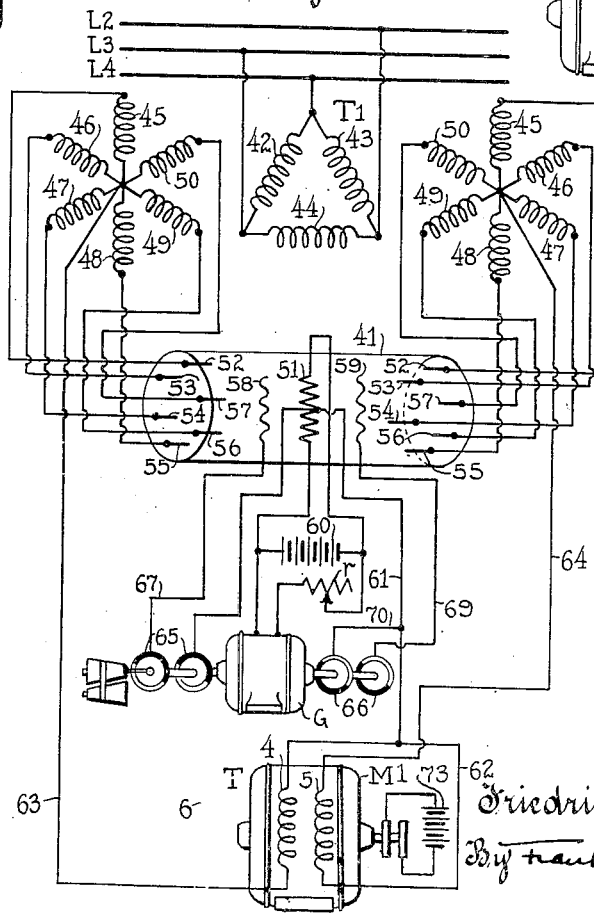

Patented May 15, 1928.

1,669,527

UNITED STATES PATENT OFFICE.

FRIEDRICH W. MEYER, OF SCHENECTADY, NEW YORK, ASSIGNOR TO THE CUTLER-HAMMER MFG. CO., OF MILWAUKEE, WISCONSIN, A CORPORATION OF WISCONSIN.

METHOD OF AND APPARATUS FOR PRODUCING MODIFIED CURRENTS, ETC.

Application filed February 1, 1918, Serial No. 214,907. Renewed January 24, 1925.

This invention relates to a method of and apparatus for utilizing an electric current to produce a modified current or a correspondingly modified magnetic flux.

An object of the invention is to enable conversion of direct current into alternating current or production of an alternating magnetic flux by direct current in a simple, convenient and efficient manner.

A further object is to enable production of an alternating current or an alternating magnetic flux of a given frequency with a supply of either direct current or alternating current of a different frequency.

A further object is to enable variation of the frequency of the alternating current or magnetic flux thus produced.

A further object is to enable variation of the frequency of the produced alternating current or magnetic flux irrespective of the frequency of the alternating current which may be utilized in the production thereof.

Other objects and advantages of the invention will hereinafter appear.

According to the present invention it is proposed to accomplish by electroionic discharge, conversion of a direct current or an alternating current, as the case may be, into unidirectional and intermittent pulsatory currents and to utilize the latter for the production of an alternating current or alternating magnetic flux according to requirements.

The accompanying drawing illustrates certain forms of apparatus for carrying out the invention and the same will now be described, it being understood that the apparatus illustrated is susceptible of various modifications.

In the drawing,

Figure 1 shows diagrammatically apparatus for converting direct current into alternating current for operation of an alternating current motor;

Fig. 2 shows diagrammatically modified means for the same purpose; and,

Fig. 3 shows diagrammatically apparatus for producing alternating current of variable frequency from a source of alternating current of given frequency, or alternatively creating an alternating magnetic field in an electric motor by the intermittent pulsatory currents obtained from said source.

Referring to Fig. 1, lines L, L¹ supply direct current of high potential to be converted into alternating current for operation of a motor M of the synchronous type with a rotating field. The field of the motor M is supplied with current as from a battery 1 while a transformer T, electroionic devices 2 and 3 and a small alternating current variable speed generator G are provided to convert the supplied current into alternating current for the armature of said motor.

The transformer T is provided with primary windings 4 and 5 which are connected through the electroionic devices 2 and 3 respectively to the direct current line L, L¹, and with a secondary winding 6 connected to the motor armature.

The electroionic devices 2 and 3 are each provided with a cathode 7, heated as by current from a battery 8, a main anode 9 and an auxiliary anode or grid 10. The main anodes of the two devices are connected in parallel to line L¹ while the cathodes of the two devices are connected to the line L, each through one of the secondary windings of the transformer T. More specifically the cathode of device 2 is connected by conductor 11 to the left hand terminal of transformer winding 4, the opposite terminal of said winding being connected by conductor 12 to line L while the cathode of device 3 is connected by conductor 13 to the right hand terminal of transformer winding 5, the opposite terminal of the latter winding being connected by conductor 14 to line L. Thus the currents supplied through devices 2 and 3 will traverse the transformer windings 4 and 5 in relatively opposite directions and each of said devices will inherently limit the current passing therethrough to a unidirectional flow. Accordingly induction of a reverse current in either of said windings by the other is precluded.

The generator, which in practice is preferably of the two phase type is illustrated as excited by a battery 15 and provided with two sets of slip rings 16 and 17, which are respectively connected in circuit with the grids and cathode of devices 2 and 3 to impress the generator potential upon said devices alternately and in half waves. More specifically, one slip ring of set 16 is connected by conductor 18 to the grid of device 2, the other ring of said set being connected by conductors 19 and 11 to the cathode of said device, while one ring of the set 17 is connected by conductor 20 to the grid of device 3, the other ring of the latter set being connected by conductors 21 and 13 to the cathode of the latter device.

Thus assuming that the potential impressed alternately upon the grids by the generator G is required to effect flow of currents through the devices 2 and 3, it will be apparent that the currents thus obtained and supplied to the windings 4 and 5 will be of a unidirectional and intermittent pulsatory character, and of substantially 180° displacement. Accordingly as these currents traverse the windings 4 and 5 in opposite directions, said windings will produce component intermittent pulsatory magneto-motive forces and a resultant alternating magnetic flux. And obviously such an alternating magnetic flux in the primary of the transformer will induce an alternating current in the secondary of the transformer to be supplied to the motor M. The frequency of the alternating current thus supplied will be the same as the frequency of the component intermittent pulsatory currents which in turn is governed by the generator G. Hence the frequency of the alternating current may be varied by regulation of the speed of the generator G.

It is, of course, to be understood that the primary winding of the transformer might be dispensed with where it is merely desired to provide an alternating magnetic field, as where the windings 4 and 5 constitute armature windings for the motor as shown in Fig. 3. Further, it is to be understood that various types of electroionic devices may be employed and that as hereinafter set forth, the line-voltage may be sufficient to effect flow of currents through the electroionic devices in which event the desired intermittent pulsations may be obtained by negative voltages on the grids.

Referring to Fig. 2, which shows a modification of the apparatus described, a single electroionic device 22 is provided in lieu of the devices 2 and 3 and the generator G having driving and speed varying means similar to those illustrated in Fig. 1 is provided with a single set of slip rings to supply potential to the device 22 through a transformer $t$. Also, in this figure there are provided batteries 23 for inclusion in the sensitive circuits of the electroionic devices.

The electroionic device 22 has a single cathode 24, heated as by current from a battery 25, two main anodes 26 and 27 arranged on opposite sides of the cathode and two auxiliary anodes or grids 28 and 29, each interposed between one of the main anodes and the common cathode. The main anode 26 is connected by conductor 30 to the left hand terminal of winding 4 of transformer T, and the main anode 27 is connected by conductor 31 to the right hand terminal of winding 5 of said transformer, while the opposite terminals of said windings are connected by a common lead 32 to line L. The cathode 24, on the other hand, is connected by conductor 33 to line $L^1$ and also to each of the grids 28 and 29 through a winding of transformer $t$. More specifically the transformer $t$ is provided with a primary winding 34 supplied by generator G and two secondary windings 35 and 36, the cathode 24 being connected by conductors 33 and 37 to the upper terminal of winding 35 and lower terminal of winding 36. And the lower terminal of winding 35 is connected by conductor 38 through a battery 23 to the grid 29, while the upper terminal of winding 36 is connected by conductor 39 through a battery 23 by conductor 40 to grid 28.

Thus in this instance the grid pontentials are supplied and displaced substantially 180° by the transformer $t$ which is supplied by generator G. And with the type of electroionic device illustrated the grid potentials may be utilized to effect a discharge first on one side and then on the other side of the common cathode with the result of supplying unidirectional and intermittent pulsatory currents to the primary windings of transformer T as in the previous instance. The apparatus may be so utilized either with or without the batteries 23 but use of said batteries is recommended. These batteries provide for neutralization of the potential impressed on each grid by the transformer $t$ during the discharge caused by the other grid and experiments have demonstrated that a single cathode device such as illustrated will supply a greater current when the grids are so influenced.

Also, if the line voltage is so high as to cause current to flow through the device 22 without the support of the grid potentials the batteries 23 may be employed to neutralize the positive potentials impressed upon the grids or in other words, render the grid potentials negative for checking the flow of current first on one side of the cathode and then on the other side thereof. Such an arrangement has the advantage of enabling use of a high vacuum type of electroionic device which will function as described under varying grid potentials without requiring a current supply for the grid system. Then the generator G becomes purely a potential regulator and may be designed accordingly.

Referring to Fig. 3, the same shows apparatus for utilizing the current supplied by a three phase circuit $L^2$, $L^3$, $L^4$ to produce the alternating current or alternating magnetic flux of the desired frequency. This apparatus includes a transformer $T^1$ having its primary connected to said source, an electroionic device 41 connected to the secondary of said transformer, a transformer T of the type above described to be supplied with current by the device 41 and a modified form of alternating current generator G for controlling said electroionic device.

The transformer T¹ has a three phase primary comprising delta connected coils 42, 43 and 44 which are connected to the supply circuit and two six phase secondary windings each comprising coils 45, 46, 47, 48, 49 and 50 which are star connected. The purpose of the six phase secondary windings is to provide a more nearly constant electrical field in the electroionic device, the advantage of which will hereinafter appear.

The electroionic device is provided with a single cathode 51, duplicate sets of anodes 52, 53, 54, 55, 56 and 57 and two auxiliary anodes or grids 58 and 59 each interposed between the cathodes and one set of anodes. Thus, except for the multiplicity of anodes which are insulated from one another the device is structurally similar to the device 22 of Fig. 2 but as will appear, the device employed in this instance has a rectifying function. The cathode 41 is heated by a battery 60 and is connected by a conductor 61 to the upper terminal of winding 4 of transformer T and by conductors 61 and 62 to the lower terminal of transformer winding 5, the opposite terminals of said windings being respectively connected by conductors 63 and 64 to the star points of the secondary windings of transformer T¹. The anodes 52, 53, 54, 55, 56 and 57 of the left hand set are respectively connected to the coils 45, 46, 47, 48, 49 and 50 of the left hand secondary winding of transformer T¹ while the anodes of the right hand set are similarly connected to the coils of the right hand secondary winding of said transformer. Thus the anodes are subjected to the potential of the supply circuit, which tends to cause a flow of current between the same and the cathode, and as will be understood the device has an inherent rectifying action. However, the potential impressed on each anode is intermittent and therefore the device must be designed to insure against cathode action of the anodes. In other words, the vacuum of the device should be sufficient to preclude the possibility of luminous discharges between the anodes or to limit such discharges to negligible values.

The generator G, in this instance, has two sets of slip rings 65 and 66, the rings of each set being insulated throughout half of the circumference thereof and arranged to produce potentials displaced by 180°. The rings of set 65 are respectively connected by conductors 67 and 68 to the grid 58 and cathode 51 of the device 41, while the rings of set 66 are respectively connected by conductors 69 and 70—61 to the grid 59 and cathode 51. Also, in this instance, the generator is excited by battery 60 through a resistance $r$.

It will be apparent that the generator, as in Fig. 1, will impress upon the grids 58 and 59 alternately and in half waves a potential which it may be assumed is positive. Then, assuming that the potential drop between the anodes and cathodes is insufficient to cause a flow of current therebetween the potential impressed upon the grids by generator G will serve to cause current to flow between the grid and two sets of anodes alternately with the result of transmitting unidirectional and intermittent pulsatory currents to the windings 4 and 5 of transformer T. On the other hand, assuming a line potential sufficient to cause current to flow between the anodes and cathodes without the support of the grid potential, the slip rings on generator G may be made continuous and the batteries corresponding to the batteries 23 of Fig. 2 may be included in the grid circuits to subject the grids to negative potentials to check the flow of current first between one set of anodes and the cathode and then between the other set of anodes and the cathode with the result already described. In this connection it may also be noted that full slip rings may be employed for impressing positive potentials upon the grids, batteries being preferably employed in the grid circuits, as described in connection with Fig. 2 although such batteries may be omitted.

As shown in Fig. 3, the transformer windings 4 and 5 may be employed as the stator windings of a motor M¹, said motor having its rotor supplied with current from a battery 73.

What I claim as new and desire to secure by Letters Patent is:

1. In combination, a source of current, electroionic apparatus supplied by said source and having a plurality of main circuits and sensitive circuits and an alternating current machine operable to impress a potential upon said sensitive circuits alternately and in half waves.

2. In combination, a direct current circuit, an electroionic device having a plurality of anodes, a common cathode therefor and a plurality of grids, said anodes and cathode being connected to said circuit, an alternating current machine, means for impressing alternating potentials from said machine upon said grids alternately, means for neutralizing the potential impressed upon each of said grids under given potential conditions of the other grid and means for utilizing the currents passing said device to produce an alternating magnetic flux.

3. In an apparatus for producing alternating current of given frequency from a source of direct current or alternating current of different frequency, in combination, a plurality of rectifying electrodes for transmitting electrical impulses by electro-ionic discharge, an alternating current machine, grids to be subjected individually to impressed potentials from said machine for controlling the transmission of such impulses, and means for neutralizing the impressed potential of one grid under given conditions of potential of another grid.

4. Apparatus for producing alternating current of given frequency from a source of direct current or alternating current of different frequency, comprising, in combination, a plurality of rectifying electrodes for transmitting electrical energy by electro-ionic discharge, an alternating current machine, a plurality of grids to be subjected individually to potentials from said machine for controlling such transmission of energy, means for neutralizing the potential impressed upon each of said grids under given conditions of potential of another of said grids, means for utilizing the energy transmitted by said electrodes to produce an alternating magnetic flux, and means for inductively creating from such flux an alternating current.

In witness whereof, I have hereunto subscribed my name.

FRIEDRICH W. MEYER.